(12) United States Patent
Huang et al.

(10) Patent No.: US 12,063,079 B2
(45) Date of Patent: Aug. 13, 2024

(54) BASE STATION APPARATUS, COMMUNICATION METHOD, AND AGGREGATE STATION APPARATUS

(71) Applicant: NIPPON TELEGRAPH AND TELEPHONE CORPORATION, Tokyo (JP)

(72) Inventors: Chunhsiang Huang, Musashino (JP); Yushi Shirato, Musashino (JP); Naoki Kita, Musashino (JP)

(73) Assignee: NIPPON TELEGRAPH AND TELEPHONE CORPORATION, Tokyo (JP)

( * ) Notice: Subject to any disclaimer, the term of this patent is extended or adjusted under 35 U.S.C. 154(b) by 0 days.

(21) Appl. No.: 17/786,031

(22) PCT Filed: Dec. 17, 2019

(86) PCT No.: PCT/JP2019/049377
§ 371 (c)(1),
(2) Date: Jun. 16, 2022

(87) PCT Pub. No.: WO2021/124442
PCT Pub. Date: Jun. 24, 2021

(65) Prior Publication Data
US 2023/0036874 A1 Feb. 2, 2023

(51) Int. Cl.
*H04B 7/02* (2018.01)
*H04B 7/024* (2017.01)
(Continued)

(52) U.S. Cl.
CPC ............ *H04B 7/024* (2013.01); *H04W 16/28* (2013.01); *H04W 74/0833* (2013.01)

(58) Field of Classification Search
CPC ................. H04B 7/024; H04W 16/28; H04W 74/0833
(Continued)

(56) References Cited

U.S. PATENT DOCUMENTS

| 10,841,914 B2 * | 11/2020 | Liou | ................. H04L 5/0094 |
| 2008/0125131 A1 * | 5/2008 | Guo | ................. H04L 65/611 455/446 |

(Continued)

OTHER PUBLICATIONS

S. Deronne et al., Analysis of the MAC Performances in 802.11g Radio-over-Fiber Systems, 2011 18th IEEE Symposium on Communications and Vehicular Technology in the Benelux (SCVT), Nov. 22, 2011, pp. 1-5.

(Continued)

*Primary Examiner* — Kevin M Burd
(74) *Attorney, Agent, or Firm* — Harness, Dickey & Pierce, P.L.C.

(57) ABSTRACT

A base station apparatus includes a centralized station apparatus and a plurality of access points connected to the centralized station apparatus via optical fibers. Based on propagation delay times in the optical fibers, the centralized station apparatus performs grouping such that access points, among a plurality of access points, with a difference in propagation delay time within a threshold value, belong to the same group. The plurality of access points perform connection processing for each of the groups, to communicate with wireless terminals subordinate to the plurality of access points.

15 Claims, 20 Drawing Sheets

(51) Int. Cl.
*H04W 16/28* (2009.01)
*H04W 74/0833* (2024.01)

(58) Field of Classification Search
USPC .......................................... 375/267
See application file for complete search history.

(56) References Cited

U.S. PATENT DOCUMENTS

| | | | | |
|---|---|---|---|---|
| 2008/0259967 | A1* | 10/2008 | Laulainen | H04J 3/0664 |
| | | | | 370/503 |
| 2015/0229377 | A1* | 8/2015 | Kuchi | H04B 7/0626 |
| | | | | 370/252 |
| 2019/0115657 | A1* | 4/2019 | Hwang | H04B 7/0615 |

OTHER PUBLICATIONS

Yasaman Ghasempour et al., IEEE 802.11ay: Next-Generation 60 GHz Communication for 100 GB/s Wi-Fi, IEEE Communications Magazine, vol. 55, No. 12, 2017.

* cited by examiner

| ACCESS POINT NUMBER | PROPAGATION DELAY TIME ($\mu$s) | RATIO BETWEEN PROPAGATION DELAY TIME AND TIME LENGTH $T_S$ OF ONE TIME SLOT (ROUNDED TO INTEGER) | GROUP |
|---|---|---|---|
| 01 | 180 | 4 | 3 |
| 02 | 65 | 2 | 2 |
| 03 | 10 | 1 | 1 |
| 04 | 80 | 2 | 2 |
| ... | ... | ... | ... |

BASE STATION APPARATUS, COMMUNICATION METHOD, AND AGGREGATE STATION APPARATUS

CROSS-REFERENCE TO RELATED APPLICATIONS

This application is a 371 U.S. National Phase of International Application No. PCT/JP2019/049377, filed on Dec. 17, 2019. The entire disclosure of the above application is incorporated herein by reference.

TECHNICAL FIELD

The present invention relates to a base station apparatus, a communication method, and a centralized station apparatus.

BACKGROUND ART

Radio communication systems require smaller base station apparatuses and more flexible station placement designs. A base station apparatus includes a centralized station apparatus and a plurality of access points. The access points are disposed remote from the centralized station apparatus. The disposed access points are connected to the centralized station apparatus via optical fibers.

NPL 1 discloses a system for performing communications using Radio over Fiber (RoF) (hereinafter referred to as "RoF radio communication system"). In the RoF communication system, the radio signals of a plurality of radio antennas are multiplexed and transmitted through shared optical fibers. The centralized station apparatus accommodates the radio signals that are multiplexed by the radio antennas and are transmitted from the radio antennas.

In the RoF radio communication system, hardware for performing arithmetic processing on the radio signals is integrated with the centralized station apparatus. Thus, at the access points for receiving the radio signals, hardware for performing arithmetic processing on the received radio signals may be absent. In this way, the RoF radio communication system is an economical communication system.

Moreover, the RoF radio communication system may provide high-capacity communication service for end users by using the radio frequencies of a millimeter-wave band (57 to 64 GHz) and a technique standardized as IEEE802.11ay standard (see NPL 2).

CITATION LIST

Non Patent Literature

[NPL 1] S. Deronne, V. Moeyaert and S. Bette, "Analysis of the MAC performances in 802.11g Radio-over-Fiber Systems," in Proc. 18th IEEE SCVT, November 2011.
[NPL 2] Y. Ghasempour, C. da Silva, C. Corderio, E. Knightly, "IEEE 802.11ay: Next-Generation 60 GHz Communication for 100 Gb/s Wi-Fi," IEEE Communications Magazine, December 2017.

SUMMARY OF THE INVENTION

Technical Problem

In IEEE802.11ay standard, the RoF communication system performs directional transmission with array antennas so as to improve the gain of a line for the radio transmission of a millimeter-wave band. In directional transmission between an access point and a wireless terminal, beamforming training is necessary for the access point and the wireless terminal (see NPL 2).

FIG. 21 illustrates an example of the process of beamforming training. At the beginning of a beacon interval in FIG. 21, an association beamforming training (A-BFT) period (hereinafter referred to as "A-BFT period") is started at a predetermined timing after the completion of a beacon transmission interval (BTI) serving as a control signal (hereinafter referred to as "BTI period"). At the access point (AP) and the wireless terminal (WT) to make a directional transmission, beamforming training is performed with random access, in which the time slot of a randomly accessible period in the A-BFT period is used.

FIG. 22 illustrates an example of randomly accessible periods in the A-BFT period. In FIG. 22, access points and terminal sets have different propagation delay times according to the length of an optical fiber connecting the centralized station apparatus and the access points. According to the propagation delay time, the randomly accessible periods vary among the access points and the terminal sets. In this case, a problem may arise as follows.

The centralized station apparatus transmits a beacon as a control signal to a terminal set "#n" (n is an integer of 1 to N, N being an integer equal to or larger than 2) for performing radio communications with an access point "#n" and the access point "#n." Since the access points have different propagation delay times, the beacon reaches the access points at different times. For example, the access point "#1" and the terminal set "#1" have a propagation delay time of "$t_1-t_0$." The access point "#N" and the terminal set "#N" have a propagation delay time of "$t_N-t_0$."

Hereinafter, a direction from the access point or the terminal set to the centralized station apparatus is referred to as "upstream." A direction from the centralized station apparatus to the access point or the terminal set is referred to as "downstream."

The A-BFT period is divided into discrete time slots. The time slots 100-1 to 100-K (K is an integer equal to or larger than 1) are time slots for initial connection. The wireless terminal of the terminal set compliant with IEEE802.11ay standard randomly selects one of the time slots 100-1 to 100-K. Beamforming training is performed in the upstream direction with the selected time slot, allowing the wireless terminal of the terminal set to make a communication connection (initial connection) to the centralized station apparatus.

If a propagation delay time is 0 in the optical fiber, the randomly accessible periods in the A-BFT period are as long as the time length of K time slots. An actual propagation delay time in the optical fiber is not 0 and thus the number of time slots selectable with random access by the wireless terminal of the terminal set in the A-BFT period is smaller than K according to the propagation delay time. The length of the randomly accessible period in the A-BFT period is represented by expression (1).

[Math. 1]

$$K - \left\lceil \frac{T - 2 \times (t_N - t_0)}{T_s} \right\rceil \quad (1)$$

where "T" represents the length of the A-BFT period. The A-BFT period includes the K time slots 100. "$t_0$" represents the timing of the start of the A-BFT period after the transmission of the beacon as the control signal. "$t_1$" represents the timing of the arrival of the beacon at the wireless terminal "#1." "$t_N$" represents the timing of the arrival of the beacon at the wireless terminal "#N." "$T_s$" represents the time length of one time slot in the A-BET period.

The access point connected to the centralized station apparatus via the optical fiber and the terminal set for performing radio communications with the access point have a short randomly accessible period in the A-BFT period as indicated in expression (1). In other words, the longer the propagation delay time, the lower the success rate of transmission of the access point and the terminal set in the upstream direction. If the wireless terminal of the terminal set cannot select any time slots in the randomly accessible period, the wireless terminal cannot complete beamforming training in the upstream direction in the A-BFT period, thereby failing to make a communication connection between the wireless terminal and the centralized station apparatus.

As described above, if propagation delay times between the centralized station apparatus and the access points vary among the access points, unfortunately, a chance for radio communications by the wireless terminals in the upstream direction is not equally provided at the access points.

With the foregoing in view, it is an object of the present invention to provide a base station apparatus, a communication method, and a centralized station apparatus, by which even if propagation delay times between the centralized station apparatus and access points vary among the access points, a chance for radio communications by wireless terminals in the upstream direction can be equally provided at the access points.

Means for Solving the Problem

An aspect of the present invention is a base station apparatus including a centralized station apparatus and a plurality of access points connected to the centralized station apparatus via optical fibers, wherein based on propagation delay times in the optical fibers, the centralized station apparatus performs grouping such that the access points, among the plurality of access points, with a difference in propagation delay time within a threshold value, belong to the same group, and the plurality of perform connection processing for each of the groups, to communicate with wireless terminals subordinate to the plurality of access points.

An aspect of the present invention is a communication method performed by a base station apparatus including a centralized station apparatus and a plurality of access points connected to the centralized station apparatus via optical fibers, wherein based on propagation delay times in the optical fibers, the centralized station apparatus performs grouping such that access points, among the plurality of access points, with a difference in propagation delay time within a threshold value, belong to the same group, and the plurality of access points perform connection processing for each of the groups, to communicate with wireless terminals subordinate to the plurality of access points.

An aspect of the present invention is a centralized station apparatus connected to a plurality of access points via optical fibers, including: a centralized-station control unit for performing grouping based on propagation delay times in the optical fibers such that access points, among the plurality of access points, with a difference in propagation delay time within a threshold value, belong to the same group; and a transmission unit for notifying a result of grouping to the access points connected in groups to communicate with wireless terminals subordinate to the access points.

Effects of the Invention

According to the present invention, even if propagation delay times between the centralized station apparatus and the access points vary among the access points, a chance for radio communications by the wireless terminals in the upstream direction can be equally provided at the access points.

DESCRIPTION OF EMBODIMENTS

Embodiments of the present invention will be specifically described below with reference to the accompanying drawings.

First Embodiment

Figure 1:
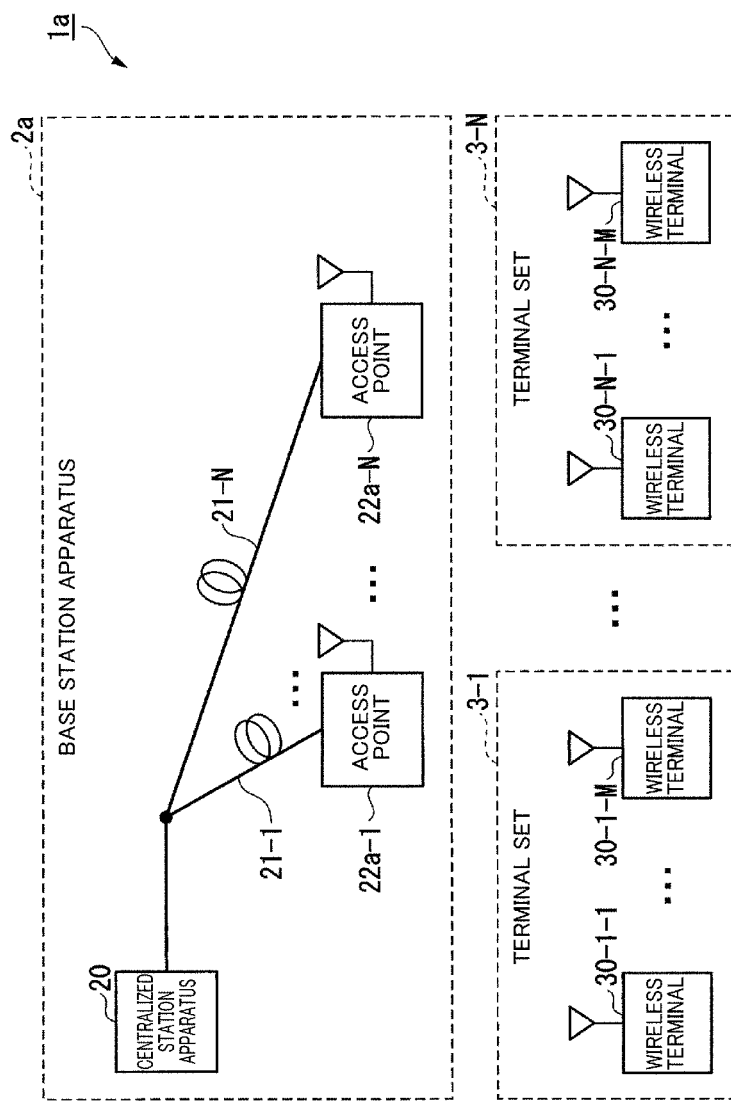
FIG. 1 illustrates a configuration example of a communication system according to a first embodiment.

FIG. 1 illustrates a configuration example of a communication system 1a. The communication system 1a is an RoF radio communication system. The communication system 1a includes a base station apparatus 2a and N (N is an integer equal to or larger than 2) terminal sets 3.

The base station apparatus 2a includes a centralized station apparatus 20, N optical fibers 21, and N access points 22a. The base station apparatus 2a may be provided with an optical splitter. The optical fibers 21-1 to 21-N may have different lengths. The length of the optical fiber 21 can be converted into the propagation delay time of a signal. In other words, the longer the optical fiber 21, the longer the propagation delay time of the signal transmitted through the optical fiber 21.

In the base station apparatus 2a, hardware for performing arithmetic processing (signal processing) on an electric signal corresponding to a radio signal is integrated with the centralized station apparatus 20. The centralized station apparatus 20 performs predetermined signal processing on the electric signal corresponding to the radio signal.

For example, the centralized station apparatus 20 acquires an optical signal from the access point 22a in response to the radio signal received from a wireless terminal 30 by the access point 22a. The centralized station apparatus 20 converts the acquired optical signal into an electric signal. The centralized station apparatus 20 performs predetermined signal processing on the electric signal obtained as a result of conversion.

For example, the centralized station apparatus 20 generates the optical signal by performing the predetermined signal processing on a control signal or the electric signal indicating user data. The centralized station apparatus 20 transmits the generated optical signal to the access point 22a. The optical signal transmitted thus to the access point 22a is converted into a radio signal by the access point 22a. The radio signal obtained as a result of conversion is transmitted to the wireless terminal 30 by the access point 22a.

The centralized station apparatus 20 schedules the communications of the wireless terminals 30, which perform radio communications with the access points 22a, according to the respective propagation delay times of the access points 22a.

The centralized station apparatus 20 performs downstream communications with the access point 22a-n by using the optical signal transmitted through the optical fiber 21-n (n is an integer of 1 to N). The centralized station apparatus 20 performs downstream communications with the access point 22a by using, for example, a frame format defined by IEEE802.11 standard (Reference: "Wireless LAN Medium Access Control (MAC) and Physical Layer (PHY) Specifications," IEEE Standard 802.11-2016.). The centralized station apparatus 20 performs downstream communications with the wireless terminal 30 via the optical fiber 21-n and the access point 22a-n.

The centralized station apparatus 20 estimates a propagation delay time between the centralized station apparatus 20 and the access point 22a. The centralized station apparatus 20 performs grouping on the access points 22a connected to the optical fibers 21, each indicating the propagation delay time of a certain range. The centralized station apparatus 20 causes the access points 22a to perform directional transmission in a communication period for each group. With this configuration, even if propagation delay times between the centralized station apparatus 20 and the access points 22a vary among the access points 22a, a chance for radio communications by the wireless terminals 30 in the upstream direction can be equally provided at the access points 22a.

The access point 22a performs upstream communications with the centralized station apparatus 20 by using the optical signal transmitted through the optical fiber 21-n. The access point 22a performs upstream communications with the centralized station apparatus 20 by using, for example, the frame format defined by IEEE802.11 standard. The access point 22a-n performs downstream communications with the predetermined wireless terminal 30 in a wireless terminal set 3-n (subordinate to the access point) by using the radio signal.

The terminal set 3 includes at least one wireless terminal 30. The number of wireless terminals 30 constituting the terminal set 3 may vary for each of the terminal sets 3. In the following example, the terminal sets 3 each include M (M is an integer equal to or larger than 1) wireless terminals 30. The wireless terminal 30-n-m (m is an integer of 1 to M) performs upstream communications with the access point 22a-n by using the radio signal.

An example of the frame format defined by IEEE802.11 standard will be described below.

Figure 2:
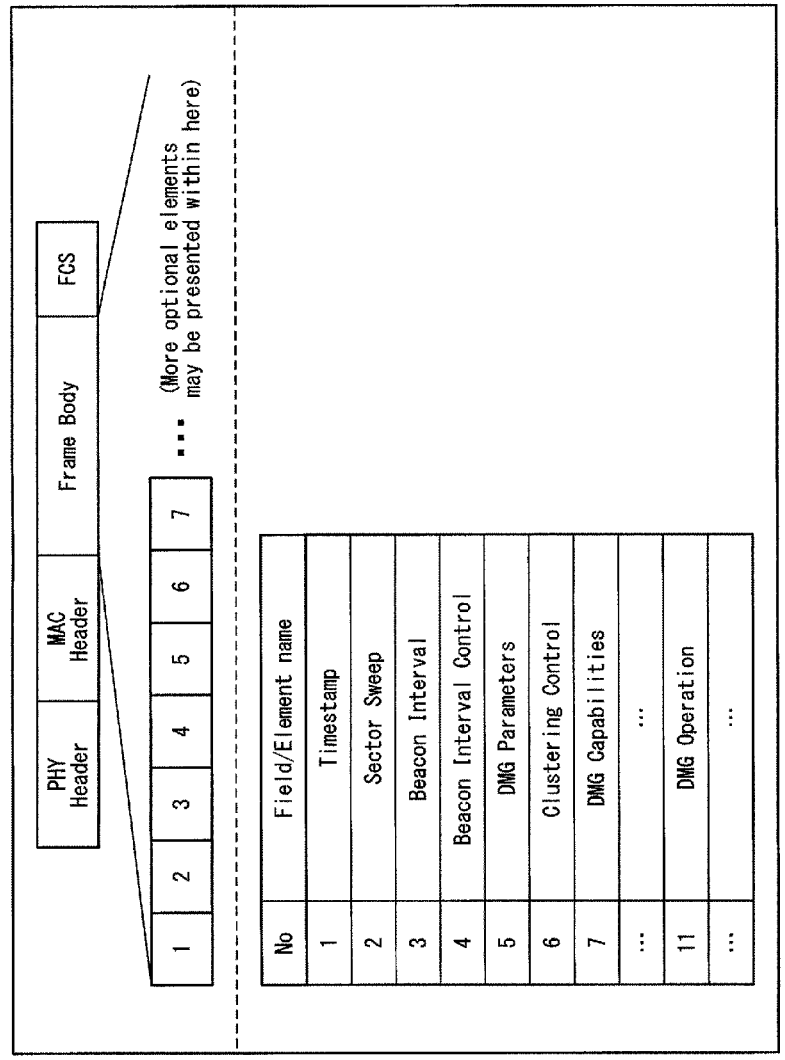
FIG. 2 illustrates an example of "DMG Beacon frame."

FIG. 2 illustrates an example of a DMG (Directional Multi Gigabit) beacon frame "DMG Beacon frame." The DMG beacon frame is transmitted in a BTI period.

In the DMG beacon frame, for example, fields or elements are defined for "Timestamp," "Sector Sweep," "Beacon Interval," "Beacon Interval Control," "DMG Parameters," "Clustering Control," "DMG Capabilities," and "DMG Operation."

Figure 3:
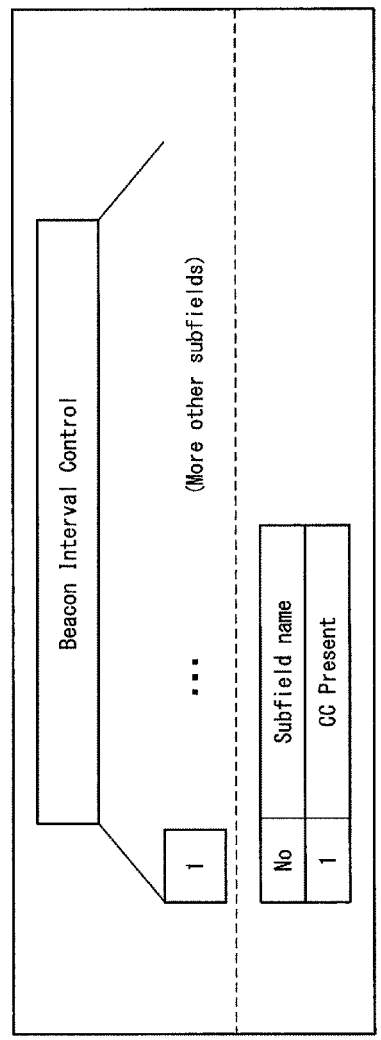
FIG. 3 illustrates an example of "Beacon Interval Control field" in the DMG beacon frame.

FIG. 3 illustrates an example of "Beacon Interval Control" in the DMG beacon frame. In the beacon interval control, "CC (Clustering Control) present" is defined as a sub field.

Figure 4:
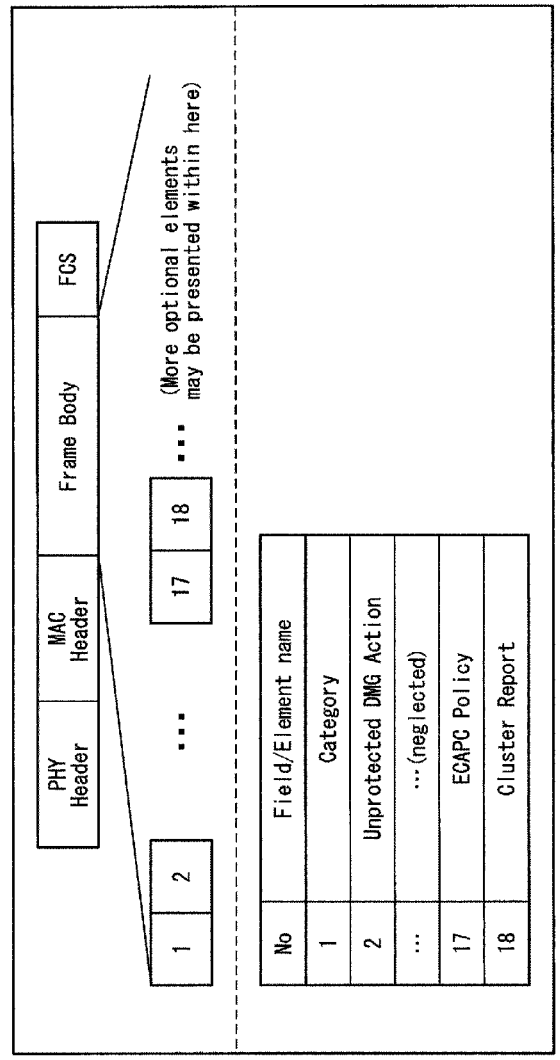
FIG. 4 illustrates an example of "Announce frame."

FIG. 4 illustrates an example of "Announce frame." An announce frame is transmitted from the access point 22a to the centralized station apparatus 20. In the announce frame, fields or elements are defined for "Category," "Unprotected DMG Action," "ECAPC (Extended centralized access point or personal basic service set control point cluster) Policy," and "Cluster Report."

Figure 5:
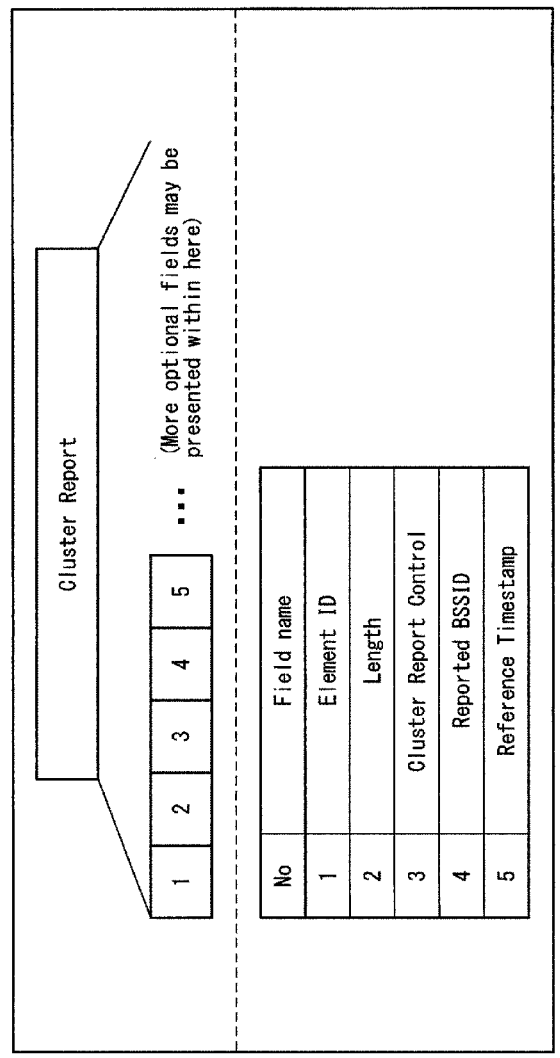
FIG. 5 illustrates an example of "Cluster Report" in an announce frame.

FIG. 5 illustrates an example of "Cluster Report" in the announce frame. In the cluster report, fields are defined for "Element ID," "Length," "Cluster Report Control," "Reported BSSID," and "Reference Timestamp."

Figure 6:
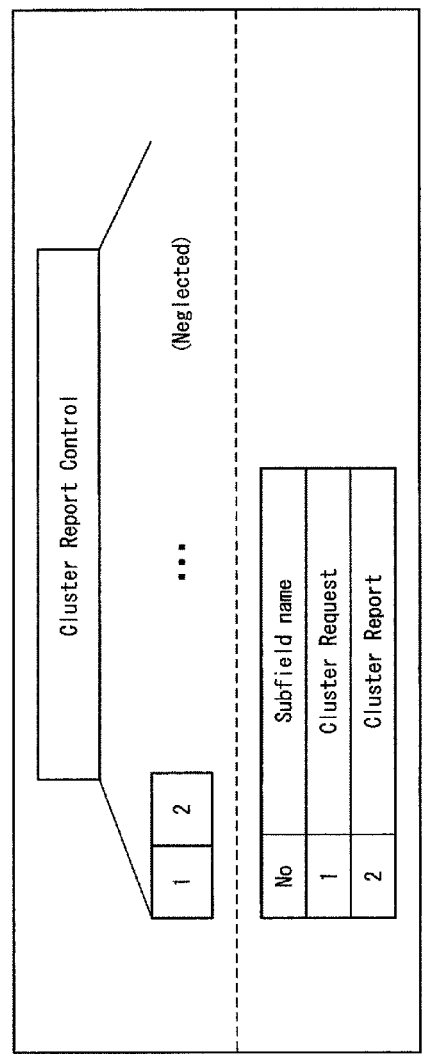
FIG. 6 illustrates an example of "Cluster Report Control" in the cluster report.

FIG. 6 illustrates an example of "Cluster Report Control" in the cluster report. In the cluster report control, sub fields are defined for "Cluster Request" and "Cluster Report."

Figure 7:
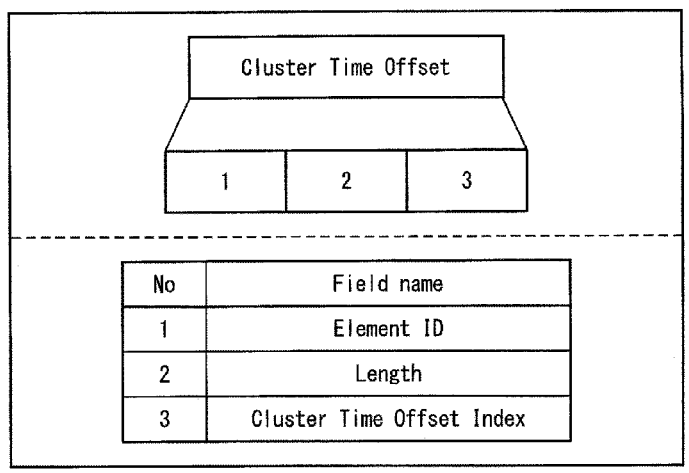
FIG. 7 illustrates an example of "Cluster Time Offset" in "Action frame."

FIG. 7 illustrates an example of "Cluster Time Offset" in "Action frame." In the cluster time offset, fields are defined for "Element ID," "Length," and "Cluster Time Offset Index."

Figure 8:
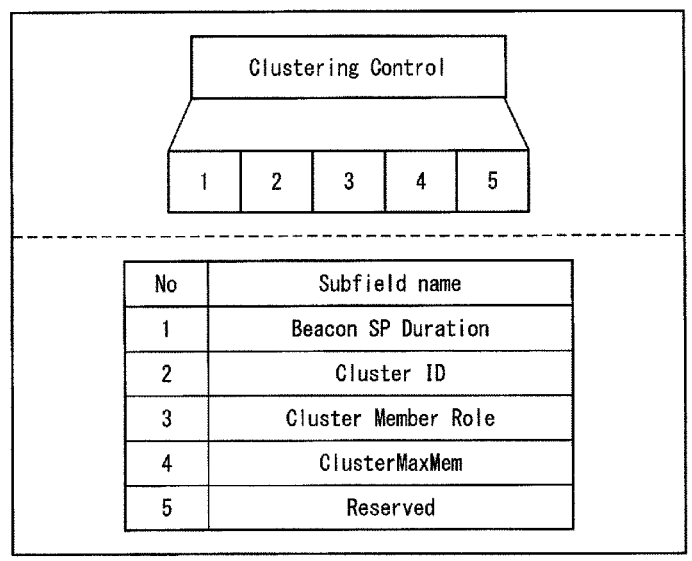
FIG. 8 illustrates an example of "Clustering Control" in the DMG beacon frame.

FIG. 8 illustrates an example of "Clustering Control" in the DMG beacon frame. In the clustering control, sub fields are defined for "Beacon SP Duration," "Cluster ID," "Cluster Member Role," and "ClusterMaxMem" (the total number of groups). Moreover, in the clustering control, reserved bits are defined as a sub field.

A configuration example of the centralized station apparatus 20 will be described below.

Figure 9:
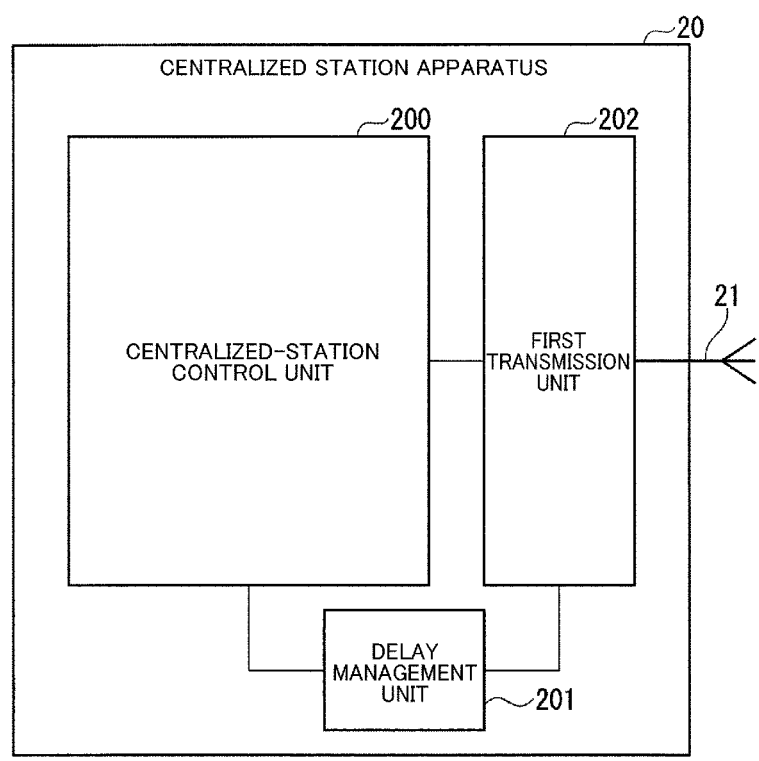
FIG. 9 illustrates a configuration example of a centralized station apparatus.

FIG. 9 illustrates the configuration example of the centralized station apparatus 20. The centralized station apparatus 20 includes a centralized-station control unit 200, a delay management unit 201, and a first transmission unit 202.

Figures 10, 11:
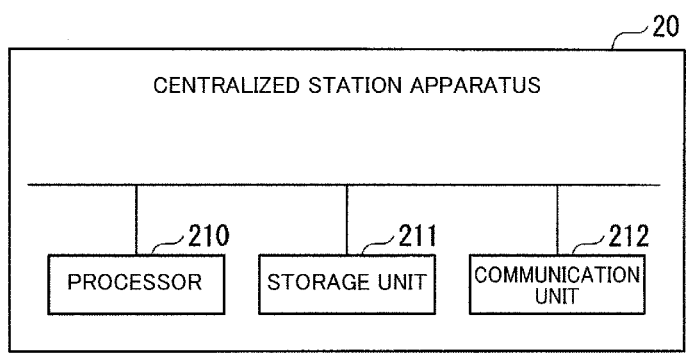
FIG. 10 illustrates a hardware configuration example of the centralized station apparatus.
FIG. 11 illustrates an example of a delay management table.

FIG. 10 illustrates a hardware configuration example of the centralized station apparatus 20. The centralized station apparatus 20 includes a processor 210, a storage unit 211, and a communication unit 212. At least part of the centralized-station control unit 200 and the delay management unit 201 is implemented as software by executing a program stored in the storage unit 211 including a nonvolatile recording medium (non-transitory recording medium), the program being executed by the processor 210, e.g., a CPU (Central Processing Unit). The program may be recorded in a computer-readable recording medium. The computer-readable recording medium is a non-transitory recording medium, for example, a portable medium such as a flexible disk, a magneto-optical disk, a ROM (Read Only Memory), or a CD-ROM (Compact Disc Read Only Memory) or a storage device such as a hard disk incorporated in a computer system. The program may be received by the communication unit 212 via a communication line. The storage unit 211 stores, for example, a program, a parameter, and a data table.

At least part of the centralized-station control unit 200 and the delay management unit 201 may be implemented by using, for example, hardware including an electronic circuit or circuitry in which an LSI (Large Scale Integration circuit), an ASIC (Application Specific Integrated Circuit), a PLD (Programmable Logic Device), or an FPGA (Field Programmable Gate Array) is used.

Referring to FIG. 9 again, a description of the configuration example of the centralized station apparatus 20 will be continued. The centralized-station control unit 200 acquires a baseband clock in the communication system 1a. The centralized-station control unit 200 acquires user data from, for example, an externa device (not illustrated). The user data is to be transmitted to the wireless terminals 30. The centralized-station control unit 200 performs predetermined signal processing in synchronization with the baseband clock in the communication system 1a.

The centralized-station control unit 200 outputs at least one DMG beacon frame to the first transmission unit 202 in the BTI period. The DMG beacon frame is transmitted to the access points 22a by the first transmission unit 202 in the BTI period.

The centralized-station control unit 200 acquires, from the delay management unit 201, signals indicating the propagation delay times of the respective access points 22a connected to the first transmission unit 202 via the optical fibers 21. Based on the propagation delay times, the centralized-station control unit 200 derives the number of time slots usable for upstream communication connection made by the access points 22a and the wireless terminals 30, according to the length of a period in expression (1).

The centralized-station control unit 200 performs grouping on the access point 22a-n (n is an integer of 1 to N) connected to the centralized station apparatus 20 such that the access points 22a have equal numbers of usable time slots. The centralized-station control unit 200 may perform grouping on the access points 22a-n connected to the centralized station apparatus 20 such that the terminal sets 3 have equal numbers of usable time slots.

The centralized-station control unit 200 performs grouping on the access point 22a-n according to a propagation delay time on the optical fiber 21-n of the access point 22a-n connected to the centralized station apparatus 20 via the optical fiber 21-n. In other words, the centralized-station control unit 200 determines the group of the access point 22a-n according to a propagation delay time on the optical fiber 21-n of the access point 22a-n connected to the centralized station apparatus 20 via the optical fiber 21-n. The centralized-station control unit 200 notifies the group of the access point 22a-n to the access point 22a-n. In other words, the centralized-station control unit 200 notifies the result of grouping to the access point 22a-n.

The method of notification to the access point 22a-n is not limited to a specific method of notification. For example, the centralized-station control unit 200 describes an identifier (the result of grouping), which indicates the group of the access point 22a, at a position where the access point 22a can be recognized in a frame transmitted to the access point 22a. For example, in "Cluster Time Offset Index" of "Cluster Time Offset" in the action frame (FIG. 7), the centralized-station control unit 200 describes an identifier (the result of grouping) indicating the group of the access point 22a-n connected to the centralized station apparatus 20.

The centralized-station control unit 200 outputs the action frame, in which the identifier indicating the group of the access point, to the first transmission unit 202 in the BTI period. The action frame is transmitted to the access points 22a by the first transmission unit 202 in the BTI period.

The centralized-station control unit 200 schedules the communications of the wireless terminals 30, which perform radio communications with the access points 22a, according to the group of the access point 22a-n.

The delay management unit 201 derives a propagation delay times for the access point 22a-n connected to the centralized station apparatus 20 via the optical fiber. The method of deriving the propagation delay time by the delay management unit 201 is not limited to a specific method.

For example, if the access point 22a-n connected to the centralized station apparatus 20 via the optical fiber does not belong to any group, the delay management unit 201 acquires "Cluster Report" (FIG. 4) in the announce frame from the access point 22a-n via the first transmission unit 202. The delay management unit 201 derives a difference between a time described in "Reference Timestamp" (FIG. 5) of acquired "Cluster Report" and a time described in "Timestamp" (FIG. 2) of the last DMG beacon frame transmitted from the first transmission unit 202. The delay management unit 201 derives a propagation delay time (estimated value) between the centralized station apparatus 20 and the access point 22a-n based on the derived difference. The delay management unit 201 stores a delay management table. The delay management table is a data table for managing the propagation delay times of the access points 22a.

FIG. 11 illustrates an example of the delay management table. In the delay management table, an access point number, a propagation delay time, the ratio between a propagation delay time and the time length "$T_s$" of one time slot, and a group (identifier) are associated with one another. The time length of one time slot is, for example, 45 μs.

Referring to FIG. 9 again, a description of the configuration example of the centralized station apparatus 20 will be continued. The first transmission unit 202 includes an interface capable of communications with the access points 22a via the optical fibers 21. The interface is, for example, a light source, a light modulator, a photodiode, and a light demodulator.

The first transmission unit 202 converts an optical signal, which is received as upstream communications via the optical fiber 21, into an electric signal. The electric signal represents, for example, a control signal transmitted from the access point 22a. The control signal to be transmitted from the access point 22a is transmitted by using, for example, "Announce frame," "Sector Sweep frame," or "Sector Sweep Feedback frame." The control signal transmitted by using the sector sweep frame is a control signal for beamforming training. The control signal indicates, for example, the direction of a beam. The control signal transmitted by using the sector sweep feedback frame is a control signal indicating a direction that obtains the maximum received power (signal-noise ratio) in beamforming training. The first transmission unit 202 outputs the electric signal, which is obtained as a result of the conversion, to the centralized-station control unit 200 and the delay management unit 201.

The first transmission unit 202 acquires the electric signal indicating the control signal from the centralized-station control unit 200. The control signal acquired from the centralized-station control unit 200 is transmitted by using, for example, the DMG beacon frame and the action frame. For example, in the DMG beacon frame and the action frame that are used for transmitting the control signal, an identifier indicating the group of the access point 22a-n is described. The first transmission unit 202 converts an optical signal, which is transmitted as downstream communications via the optical fiber 21, from an electric signal. The first transmission unit 202 transmits the control signal to the access point 22a by using the optical signal.

The first transmission unit 202 acquires a signal indicating user data, from the centralized-station control unit 200. The first transmission unit 202 transmits the user data to the access point 22a by using the optical signal. The first transmission unit 202 transmits the user data to the access point 22a by using the optical signal.

A configuration example of the access point 22a will be described below.

Figure 12:
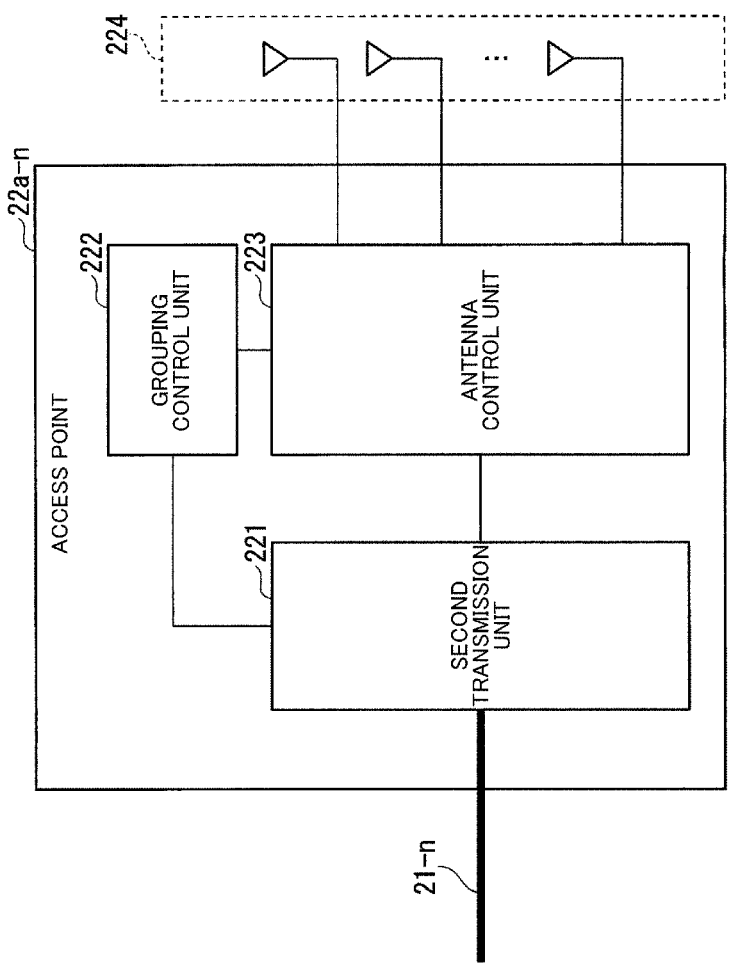
FIG. 12 illustrates a configuration example of an access point according to the first embodiment.

FIG. 12 illustrates the configuration example of the access point 22a. The access point 22a-n includes a second transmission unit 221, a grouping control unit 222, an antenna control unit 223, and an antenna 224.

The second transmission unit 221 includes an interface capable of making a communication connection with the centralized station apparatus 20 via the optical fiber 21. The interface is, for example, a light source, a light modulator, a photodiode, and a light demodulator.

The second transmission unit 221 converts an optical signal, which is received as downstream communications via the optical fiber 21, into an electric signal. The second transmission unit 221 outputs the electric signal, which is obtained as a result of the conversion, to the grouping control unit 222 and the antenna control unit 223. For example, the second transmission unit 221 outputs the received action frame to the grouping control unit 222. The second transmission unit 221 outputs the received user data to the antenna control unit 223.

The second transmission unit 221 acquires the electric signal, which indicates the control signal, from the grouping control unit 222. The control signal is transmitted by using, for example, "Announce frame," "Sector Sweep frame," or "Sector Sweep Feedback frame." The second transmission unit 221 converts an optical signal, which is transmitted as upstream communications via the optical fiber 21, from the electric signal. The second transmission unit 221 transmits the control signal and the user data to the centralized station apparatus 20 by using the optical signal.

The grouping control unit 222 acquires the electric signal, which indicates the control signal for radio communications, from the second transmission unit 221. The grouping control unit 222 decodes, for example, the action frame. The grouping control unit 222 acquires a value described in "Cluster Time Offset Index" (FIG. 7) of "Cluster Time Offset" in the decoded action frame, as an identifier indicating the group of the access point 22a. The grouping control unit 222 stores the identifier indicating the group of the access point 22a.

The antenna control unit 223 includes a high-frequency converter circuit and an amplifier circuit. When directional transmission is performed on the wireless terminals 30, the antenna control unit 223 forms a beam and changes the direction of the beam by using the antenna 224.

The antenna control unit 223 acquires the user data from the second transmission unit 221. The antenna control unit 223 acquires the control signal from the second transmission unit 221. The control signal is, for example, a signal indicating the communication schedule of the wireless terminals 30. The antenna control unit 223 transmits the control signal to the wireless terminals 30 by using the radio signal. The antenna control unit 223 transmits the user data to the wireless terminals 30 by using the radio signal.

The antenna 224 includes a plurality of antenna elements (array antennas). The antenna 224 performs upstream and downstream radio communications with the wireless terminals 30 under the control of the antenna control unit 223. At this point, the antenna 224 performs directional radio communications (directional transmission).

An operation example of the base station apparatus 2a will be described below.

Figure 13:
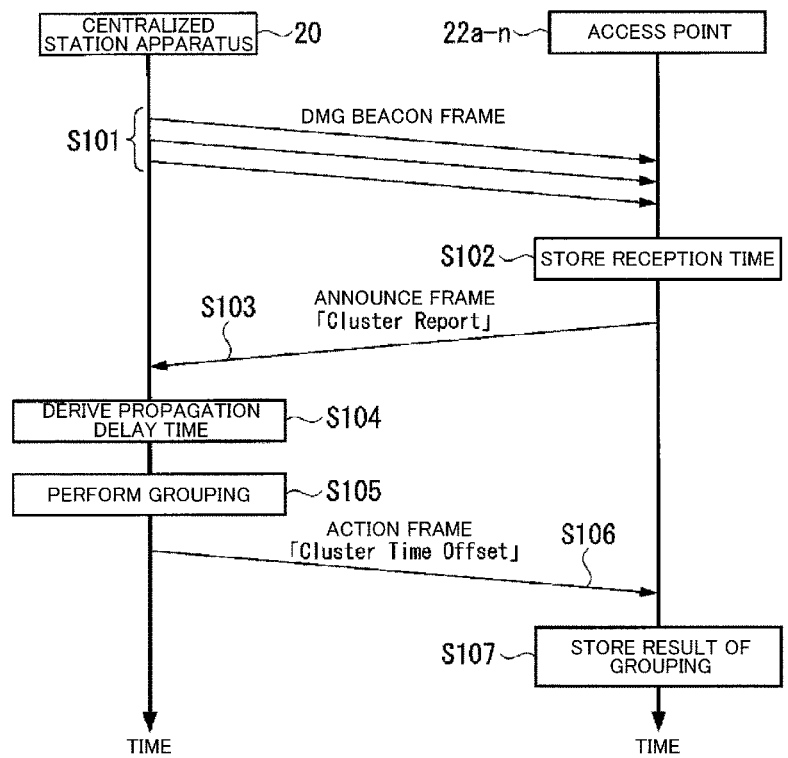
FIG. 13 is a sequence diagram indicating an example of a communication procedure between the centralized station apparatus and the access point according to the first embodiment.

FIG. 13 is a sequence diagram indicating an example of a communication procedure between the centralized station apparatus 20 and the access point 22a. By using the frame format defined by IEEE802.11 standard, the centralized station apparatus 20 and the access point 22a implement functions (i) and (ii) below.

(i) The centralized station apparatus 20 derives the propagation delay time of a signal in a wired line (e.g., an optical fiber or a signal cable) between the centralized station apparatus 20 and the access point 22a.

(ii) The centralized station apparatus 20 notifies the result of grouping (the group of the access point 22a-n) to the access point 22a-n not belonging to the group.

The centralized station apparatus 20 describes the time of transmission of the DMG beacon frame in "Timestamp" (FIG. 2) in the DMG beacon frame. The centralized station apparatus 20 describes 1 in "CC Present" (FIG. 3) of "Beacon Interval" in the DMG beacon frame. The centralized station apparatus 20 transmits multiple DMG beacon frames to the access point 22a-n that does not belong to any group (the access point that is not grouped) (step S101).

The access point 22a-n receives the DMG beacon frames. The access point 22a-n decodes the received DMG beacon frames. The access point 22a-n stores the times of receipt of the DMG beacon frames (step S102).

The access point 22a-n describes the time of receipt of the last transmitted DMG beacon frame in "Reference Timestamp" (FIG. 5) of "Cluster Report" (FIG. 4) of the announce frame to be transmitted. The access point 22a-n describes 1 in "Cluster Request" (FIG. 6) of "Cluster Report Control" (FIG. 5) in "Cluster Report" of the announce frame to be transmitted. The access point 22a-n transmits the announce frame to the centralized station apparatus 20 (step S103).

The centralized station apparatus 20 acquires the announce frame from the access point 22a-n. The centralized station apparatus 20 acquires time information described in "Reference Timestamp" (FIG. 5) from the announce frame. The centralized station apparatus 20 derives a difference between a time "$t_N$" described in "Reference Timestamp" and a time "to" described in "Timestamp" (FIG. 2) in the last transmitted DMG beacon frame.

The centralized station apparatus 20 derives a propagation delay time (estimated value) between the centralized station apparatus 20 and the access point 22a-n based on the derived difference (step S104).

Based on the derived propagation delay time, the centralized station apparatus 20 derives the number of time slots usable for upstream communication connection made by the access point 22a-n. The centralized station apparatus 20 performs grouping on the access point 22a-n based on the number of time slots usable by the access point 22a-n. The centralized station apparatus 20 determines the group of the access point 22a-n according to the number of time slots selectable by the access point 22a-n (step S105).

The centralized station apparatus 20 describes the result of grouping of the access point 22a-n (an identifier indicating the group) in "Cluster Time Offset Index" (FIG. 7) of "Cluster Time Offset" in the action frame to be transmitted. The centralized station apparatus 20 transmits the action frame to the access point 22a-n (step S106).

The access point 22a-n acquires the action frame. The access point 22a-n decodes the acquired action frame. The access point 22a-n stores the group of the access point 22a (a value described in "Cluster Time Offset Index") as a result of grouping (step S107).

The detail of step S105 in FIG. 13 will be described below.

Figure 14:
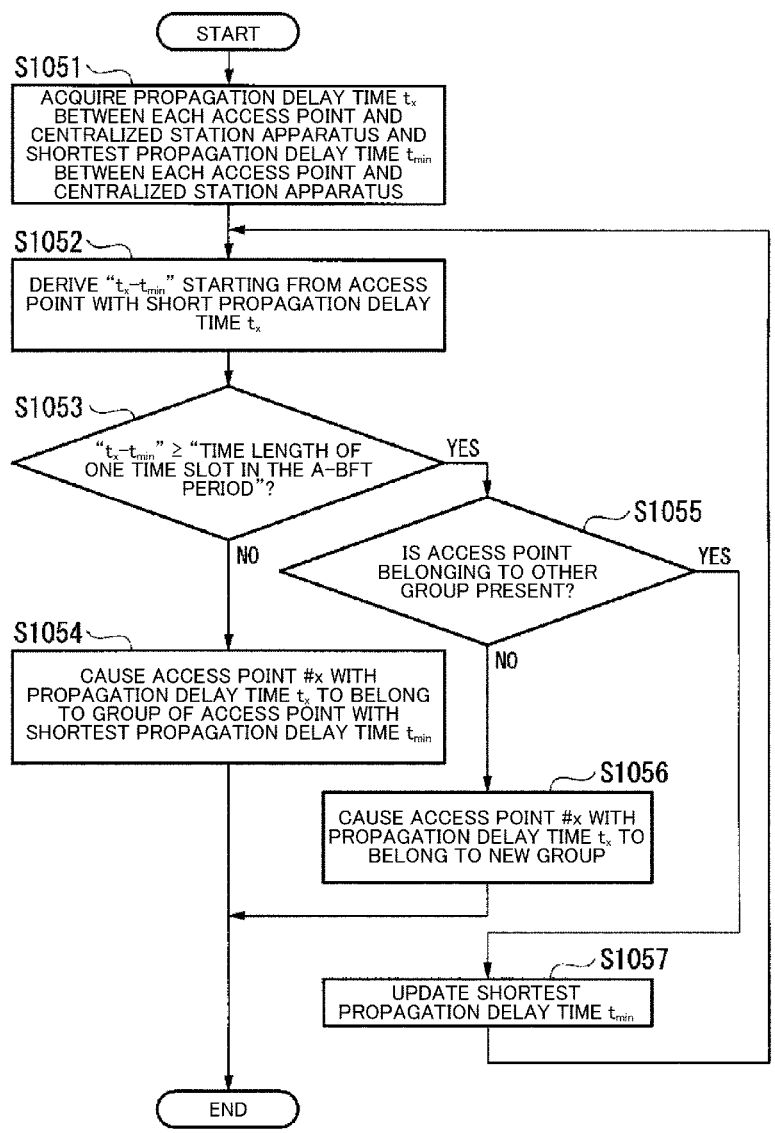
FIG. 14 is a flowchart indicating an example of grouping.

FIG. 14 is a flowchart indicating an example of grouping. The centralized-station control unit 200 performs grouping on each of the access points 22a.

A propagation delay time $t_x$ for each of the access points 22a connected to the centralized station apparatus 20 is acquired from the delay management table. From the delay management table, the centralized-station control unit 200 acquires a shortest propagation delay time tin in the delay management table as a reference propagation delay time. The centralized-station control unit 200 defines the group of the access point 22a with the shortest propagation delay time $t_{min}$ as group "1" (step S1051).

The centralized-station control unit 200 rearranges the access points 22a in the ascending order of the propagation delay times $t_x$ of the access points 22a. The centralized-station control unit 200 derives "$t_x-t_{min}$," starting from the access point 22a with a short propagation delay time $t_x$ (x is an integer of 1 to N). In other words, the centralized-station control unit 200 derives a difference between the propagation delay time $t_x$ and the shortest propagation delay time $t_{min}$, starting from the access point 22a with a short propagation delay time $t_x$ (step S1052).

The centralized-station control unit 200 determines whether a difference between the propagation delay time $t_x$ and the shortest propagation delay time $t_{min}$ is at least the time length of one time slot for random access. In other words, the centralized-station control unit 200 determines whether a difference between the propagation delay time $t_x$, and the shortest propagation delay time $t_{min}$ is at least the time length of one time slot in the A-BFT period (step S1053).

If a difference between the propagation delay time $t_x$ and the shortest propagation delay time $t_{min}$ is less than the time length of one time slot for random access (step S1053:NO), the centralized-station control unit 200 causes the access point 22a-x with the propagation delay time $t_x$ to belong to the group of the access point 22a with the shortest propagation delay time $t_{min}$ (e.g., group "1") (step S1054). The delay management unit 201 the group of the access point 22a-x in the delay management table.

If a difference between the propagation delay time $t_x$ and the shortest propagation delay time $t_{min}$ is equal to or larger than the time length of one time slot for random access (step S1053:YES), the centralized-station control unit 200 determines the presence or absence of the access point 22a belonging to a group (e.g., group "2") other than the group of the access point 22a with the shortest propagation delay time $t_{min}$ (e.g., group "1") (step S1055).

In the absence of the access point 22a belonging to a group other than the group of the access point 22a with the shortest propagation delay time $t_{min}$ (step S1055:NO), the centralized-station control unit 200 causes the access point 22a-x with the propagation delay time $t_x$ to belong to a new group (e.g., new group "2" other than group "1") (step S1056). The delay management unit 201 records the new group of the access point 22a-x in the delay management table.

In the presence of the access point 22a belonging to a group other than the group of the access point 22a with the shortest propagation delay time $t_{min}$ (step S1055:YES), the centralized-station control unit 200 defines, as an updated shortest propagation delay time $t_{min}$, the propagation delay time of the access point 22a with the shortest propagation delay time in a group (e.g., group "2" subsequent to group "1") subsequent to the group of the access point 22a with the shortest propagation delay time $t_{min}$ (step S1057). The centralized-station control unit 200 returns the processing to step S1052.

As described above, based on the propagation delay times in the optical fibers 21, the centralized-station control unit 200 performs grouping such that the access points 22a with a difference in propagation delay time within a threshold value (e.g., the time length of the time slot) belong to the same group.

An example of scheduling of communications in the centralized station apparatus 20 will be described below.

Figure 15:
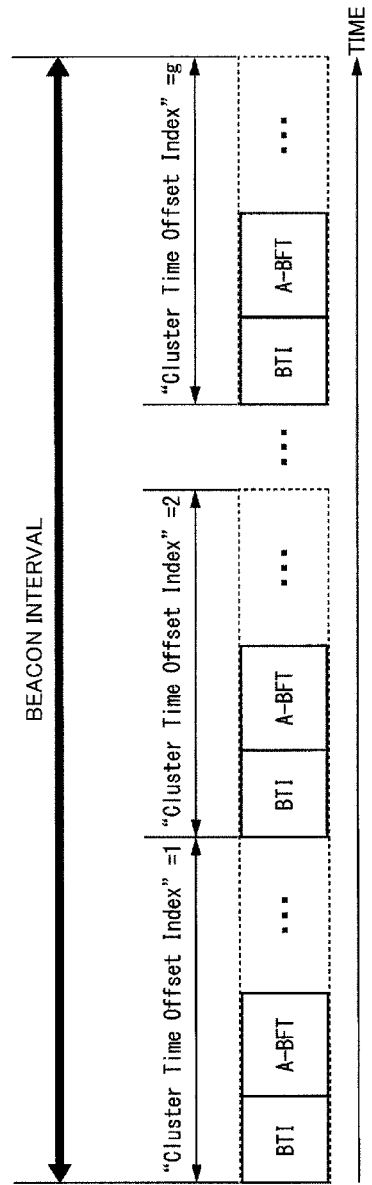
FIG. 15 is a time chart indicating an example of scheduling of communications.

FIG. 15 is a time chart indicating an example of scheduling of communications. Based on the result of grouping, the centralized-station control unit 200 chronologically divides beacon intervals for the groups ("Cluster Time Offset Index"=1, 2, . . . , g) to be subjected to beamforming training. The divided periods (periods during which the value of "Cluster Time Offset Index" is not changed) include the BTI period and the A-BFT period.

In a predetermined field of "Clustering Control" (FIG. 8) in the DMG beacon frame to be transmitted in each BTI period, the centralized-station control unit 200 describes information on a group to be subjected to beamforming training (communication connection of random access) in the A-BFT period.

The centralized-station control unit 200 may describe an identifier, which indicates a group to be subjected to beamforming training in the A-BFT period, in, for example, the reserved bits of "DMG Operation Information" of "DMG Operation" (FIG. 2) in the DMG beacon frame to be transmitted in each BTI period.

The period of "Cluster Time Offset Index=1" is a period for communications between the access points 22a of group "1" and the wireless terminals 30 subordinate to the access points 22a. The centralized-station control unit 200 allocates the period of "Cluster Time Offset Index=1" to communications between the access points 22a of group "1" and the wireless terminals 30 subordinate to the access points 22a. In the period of "Cluster Time Offset Index=1," the centralized-station control unit 200 describes information on group "1," which is to be subjected to beamforming training in the A-BFT period, in the DMG beacon frame to be transmitted in the BTI period. For example, the centralized-station control unit 200 describes 1 in "Cluster Member Role" of "Clustering Control." For example, the centralized-station control unit 200 describes the total number of groups of the access points 22a in "ClusterMaxMem" (FIG. 8) according to the result of grouping.

The period of "Cluster Time Offset Index=2" is a period for communications between the access points 22a of group "2" and the wireless terminals 30 subordinate to the access points 22a. The centralized-station control unit 200 allocates the period of "Cluster Time Offset Index=2" to communications between the access points 22a of group "2" and the wireless terminals 30 subordinate to the access points 22a. In the period of "Cluster Time Offset Index=2," the centralized-station control unit 200 describes information on group "2," which is to be subjected to beamforming training in the A-BFT period, in the DMG beacon frame to be transmitted in the BTI period. For example, the centralized-station control unit 200 describes 2 in "Cluster Member Role" of "Clustering Control." For example, the centralized-station control unit 200 describes the total number of groups of the access points 22a in "ClusterMaxMem" (FIG. 8) according to the result of grouping.

The period of "Cluster Time Offset Index=x(>2)" is a period for communications between the access points 22a of group "x" and the wireless terminals 30 subordinate to the access points 22a. The centralized-station control unit 200 allocates the period of "Cluster Time Offset Index=x" other than "Cluster Time Offset Index=1 and 2" to communications between the access points 22a of group "x" and the wireless terminals 30 subordinate to the access points 22a. In the period of "Cluster Time Offset Index=x," the centralized-station control unit 200 describes information on group "x," which is to be subjected to beamforming training in the A-BFT period, in the DMG beacon frame to be transmitted in the BTI period. For example, the centralized-station control unit 200 describes a value "x" in "Cluster Member Role" of "Clustering Control." For example, the centralized-station control unit 200 describes the total number of groups of the access points 22a in "ClusterMaxMem" (FIG. 8) according to the result of grouping.

An example of a response in the access point 22a will be described below.

In all the access points 22a connected to the centralized station apparatus 20, the second transmission unit 221 transmits the DMG beacon frame received from the centralized station apparatus 20, to the wireless terminals 30 subordinate to the access point 22a via the antenna control unit 223 and the antenna 224. The grouping control unit 222 controls a response to the centralized station apparatus 20 or the wireless terminals 30 in the A-BFT period, depending upon whether the DMG beacon frame includes an identifier indicating the group of the access point 22a. The access point 22a acquires the sector sweep frame from the wireless terminal 30 in the A-BFT period.

Figure 16:
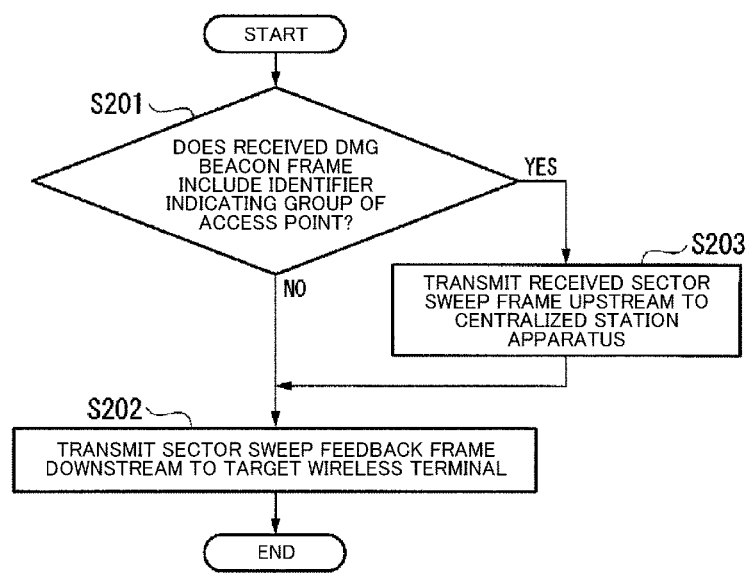
FIG. 16 is a flowchart indicating an example of a response to "Sector Sweep frame" in the access point.

FIG. 16 is a flowchart indicating an example of a response to the sector sweep frame in the access point 22a. The grouping control unit 222 determines whether the DMG beacon frame includes an identifier indicating the group of the access point 22a (a period during which a predetermined response is to be made by the access point 22a and the wireless terminals 30 subordinate to the access point 22a or a period during which a predetermined response is not to be made by the access point 22a and the wireless terminals 30 subordinate to the access point 22a) (step S201).

If the DMG beacon frame does not include an identifier indicating the group of the access point 22a (step S201:NO), the second transmission unit 221 transmits the sector sweep feedback frame downstream to the target wireless terminal 30 via the antenna control unit 223 and the antenna 224 (step S202). At this point, the second transmission unit 221 does not transmit data acquired from the wireless terminals 30 upstream to the centralized station apparatus 20. The second transmission unit 221 completes the processing indicated in FIG. 16.

If the DMG beacon frame includes an identifier indicating the group of the access point 22a (step S201:YES), the second transmission unit 221 transmits, to the centralized station apparatus 20, the sector sweep frame received from the wireless terminal 30 (step S203). The second transmission unit 221 advances to the processing of step S202.

As described above, a plurality of access points 22b are connected in parallel via the optical fibers 21-1 to 21-N. Based on the propagation delay times in the optical fibers 21, the centralized station apparatus 20 performs grouping such that the access points 22a with a difference in propagation delay time within the threshold value belong to the same group. The access points 22a make communication connections in groups to the wireless terminals 30 subordinate to the access points 22a. The centralized station apparatus 20 derives a propagation delay time based on a time stamp described in a frame to be transmitted through the optical fiber 21.

As described above, the centralized station apparatus 20 performs grouping on the access points 22a based on propagation delay times in the optical fibers 21. Thus, even if propagation delay times between the centralized station apparatus 20 and the access points 22a vary among the access points 22a, a chance for radio communications by the wireless terminals 30 in the upstream direction can be equally provided at the access points 22a by the centralized station apparatus 20.

Second Embodiment

A second embodiment is different from the first embodiment in that a plurality of access points are cascade-connected via optical fibers. The second embodiment will mainly describe differences from the first embodiment.

Figure 17:
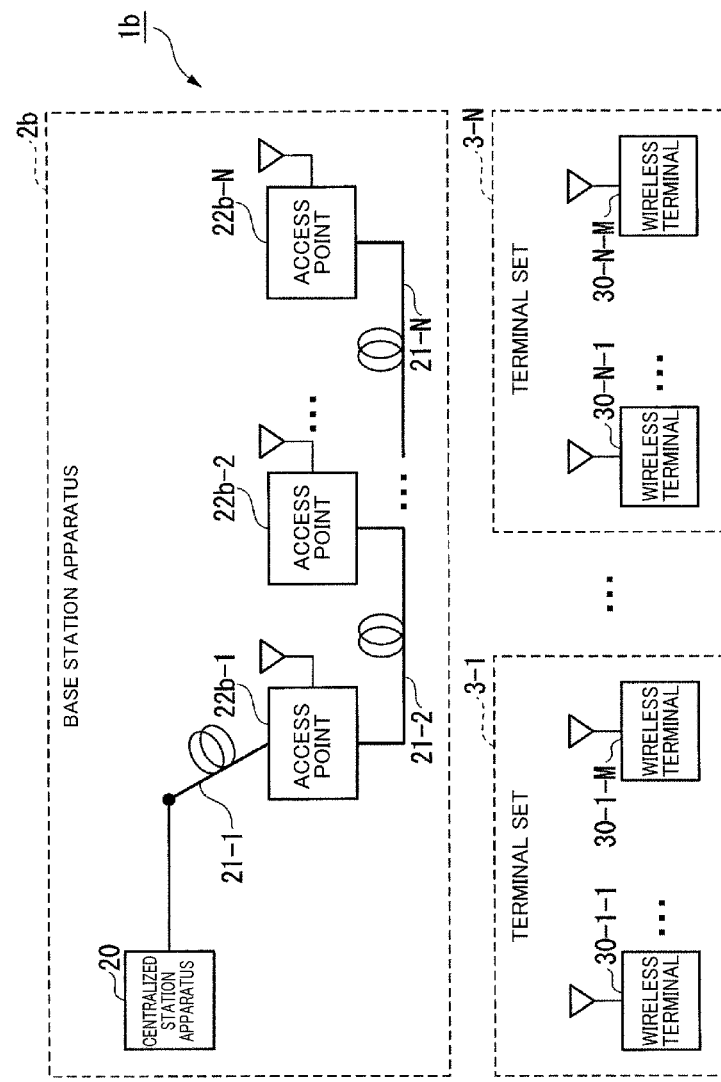
FIG. 17 illustrates a configuration example of a communication system according to a second embodiment.

FIG. 17 illustrates a configuration example of a communication system 1b. The communication system 1b is an RoF radio communication system. The communication system 1b includes a base station apparatus 2b and N terminal sets 3. The base station apparatus 2b includes a centralized station apparatus 20, N optical fibers 21, and N access points 22b. The access points 22b are cascade-connected via the optical fibers 21. In FIG. 17, for example, an access point 22b-2 is connected to the centralized station apparatus 20 via an optical fiber 21-2, an access point 22b-1, and an optical fiber 21-1. The base station apparatus 2b may be provided with an optical splitter. The optical fibers 21-1 to 21-N may have different lengths.

A centralized-station control unit 200 estimates a propagation delay time between the centralized station apparatus 20 and the access point 22b. The centralized station apparatus 20 performs grouping on the access points 22b connected to the optical fibers 21, each indicating the propagation delay time of a certain range. The centralized-station control unit 200 causes the access points 22b to perform directional transmission in a communication period for each group. Thus, even if propagation delay times between the centralized station apparatus 20 and the access points 22b vary among the access points 22b, a chance for radio communications by wireless terminals 30 in the upstream direction can be equally provided at the access points 22b by the centralized station apparatus 20.

When receiving an announce frame from the access point 22b, the centralized-station control unit 200 acquires the result of grouping of the access points 22b from the received announce frame. The centralized-station control unit 200 acquires the total number of groups of the access points 22b from the received announce frame.

Based on the total number of groups, the centralized-station control unit 200 chronologically divides beacon intervals for the groups to be subjected to beamforming training. The centralized-station control unit 200 schedules the communications of the wireless terminals 30, which perform radio communications with the access points 22b, according to the group of the access points 22b.

Figure 18:
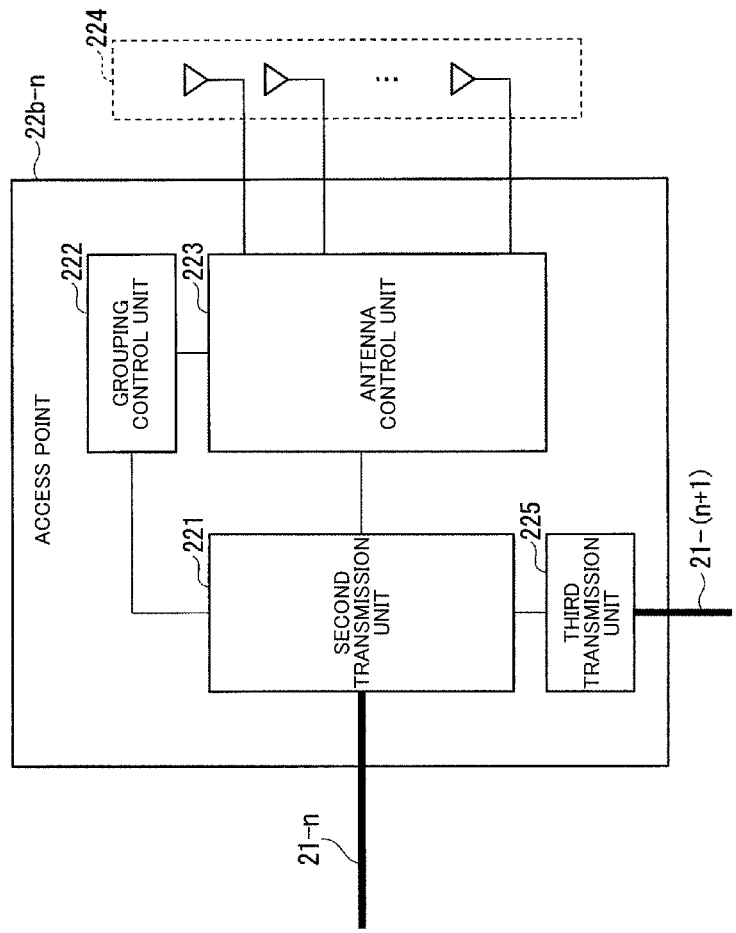
FIG. 18 illustrates a configuration example of an access point according to the second embodiment.

FIG. 18 illustrates a configuration example of the access point 22b. An access point 22b-n includes a second transmission unit 221, a grouping control unit 222, an antenna control unit 223, an antenna 224, and a third transmission unit 225.

The second transmission unit 221 of the access point 22b-n is connected to the third transmission unit 225 of the access point 22b-n via an optical fiber in the access point 22b-n. The second transmission unit 221 of the access point 22b-n performs upstream communications and downstream communications with the third transmission unit 225 of the access point 22b-n by using the optical fiber in the access point 22b-n.

The second transmission unit 221 of the access point 22b-1 is connected to the centralized station apparatus 20 via the optical fiber 21-1. The second transmission unit 221 of the access point 22b-n other than the access point 22b-1 is connected to the third transmission unit 225 of an access point 22b-(n−1), which is adjacent to the access point 22b-n, via an optical fiber 21-n. The second transmission unit 221 of the access point 22b-n performs upstream communications and downstream communications with the third transmission unit 225 of the access point 22b-(n−1) by using the optical fiber 21-n.

The third transmission unit 225 of the access point 22b-n is connected to the second transmission unit 221 of an access point 22b-(n+1), which is adjacent to the access point 22b-n, via an optical fiber 21-(n+1). The third transmission unit 225 of the access point 22b-n performs upstream communications and downstream communications with the second transmission unit 221 of the adjacent access point 22b-(n+1) by using the optical fiber 21-(n+1).

The third transmission unit 225 performs signal processing as in at least part of signal processing performed by the centralized-station control unit 200 and a delay management unit 201. In other words, the third transmission unit 225 acquires "Cluster Report" (FIG. 4) in the announce frame from the access point 22b-(n+1). The third transmission unit 225 derives a difference between a time described in "Reference Timestamp" (FIG. 5) of acquired "Cluster Report" and a time described in "Timestamp" (FIG. 2) of the last DMG beacon frame transferred from the third transmission unit 225. The third transmission unit 225 derives a propagation delay time (estimated value) between the access point 22b-n and the access point 22b-(n+1) based on the derived difference. The third transmission unit 225 may store a delay management table.

The third transmission unit 225 of the access point 22b-n performs grouping on the access point 22b-(n+1) connected to the access point 22b-n such that access points 22b have equal numbers of usable time slots. The third transmission unit 225 of the access point 22b-n may perform grouping on the access point 22b-(n+1) connected to the access point 22b-n such that terminal sets 3 have equal numbers of usable time slots.

The third transmission unit 225 of the access point 22b-n performs grouping on the access point 22b-(n+1) according to a propagation delay time in the optical fiber 21-(n+1) of the access point 22b-(n+1) connected to the access point 22b-n via the optical fiber 21-(n+1). Specifically, the third transmission unit 225 of the access point 22b-n determines the group of the access point 22b-(n+1) according to a propagation delay time in the optical fiber 21-(n+1) of an access point 22a-(n+1) connected to the centralized station apparatus 20 via the optical fiber 21-(n+1).

The third transmission unit 225 of the access point 22b-n notifies the group of the access point 22b-(n+1) to the access point 22b-(n+1) by using an action frame. The third transmission unit 225 of the access point 22b-n notifies the group of the access point 22b-(n+1) to the centralized station apparatus 20 by using an ECAPC policy in the announce frame.

Figure 19:
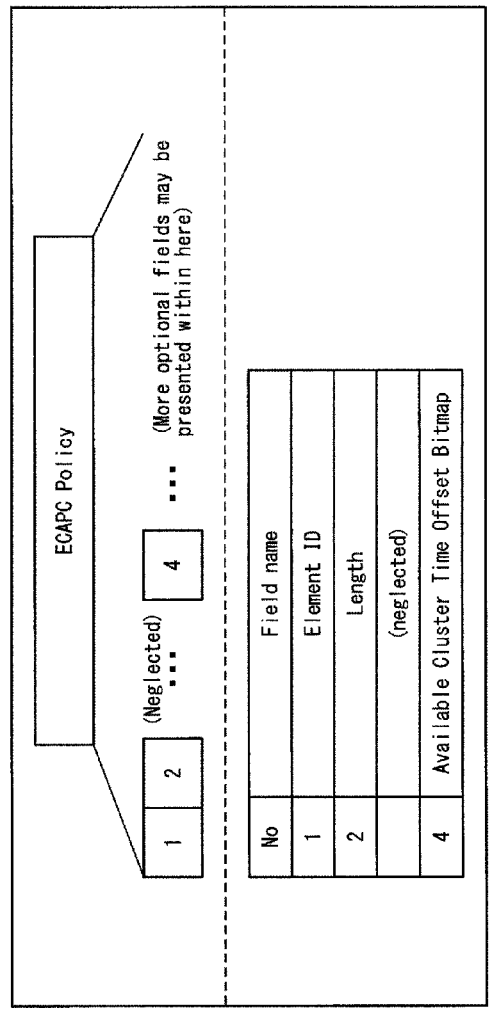
FIG. 19 illustrates an example of "ECAPC (Extended centralized access point or personal basic service set control point cluster) Policy" in an announce frame.

FIG. 19 illustrates an example of "ECAPC Policy" (FIG. 4) in the announce frame. In the ECAPC policy, fields are defined for "Element ID," "Length," and "Available Cluster Time Offset Bitmap."

An operation example of the base station apparatus 2b will be described below.

Figure 20:
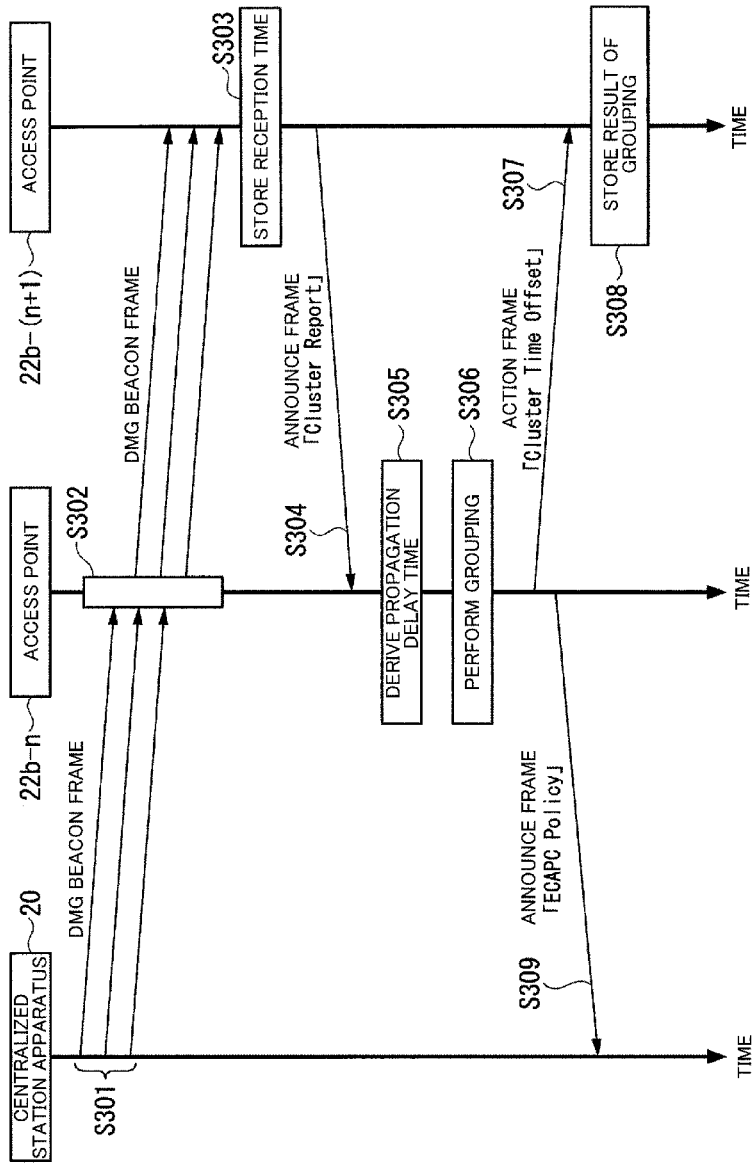
FIG. 20 is a sequence diagram indicating an example of a communication procedure between a centralized station apparatus and the access point according to the second embodiment.
Figure 21:
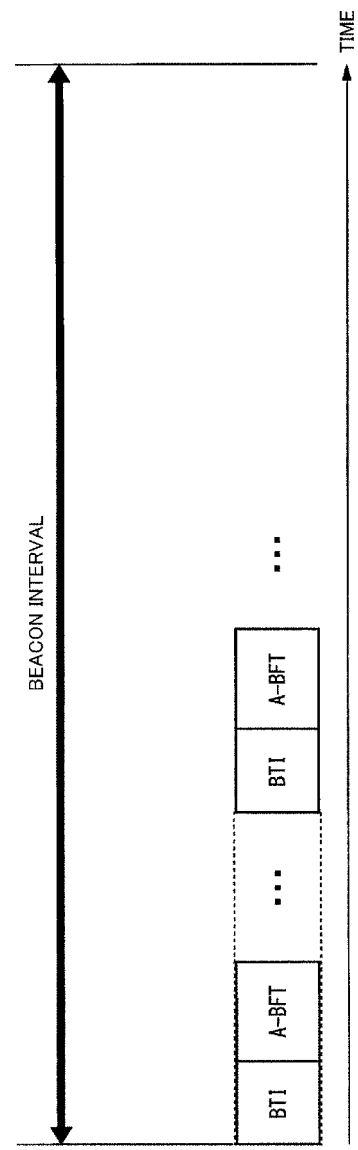
FIG. 21 illustrates an example of the process of beamforming training.
Figure 22:
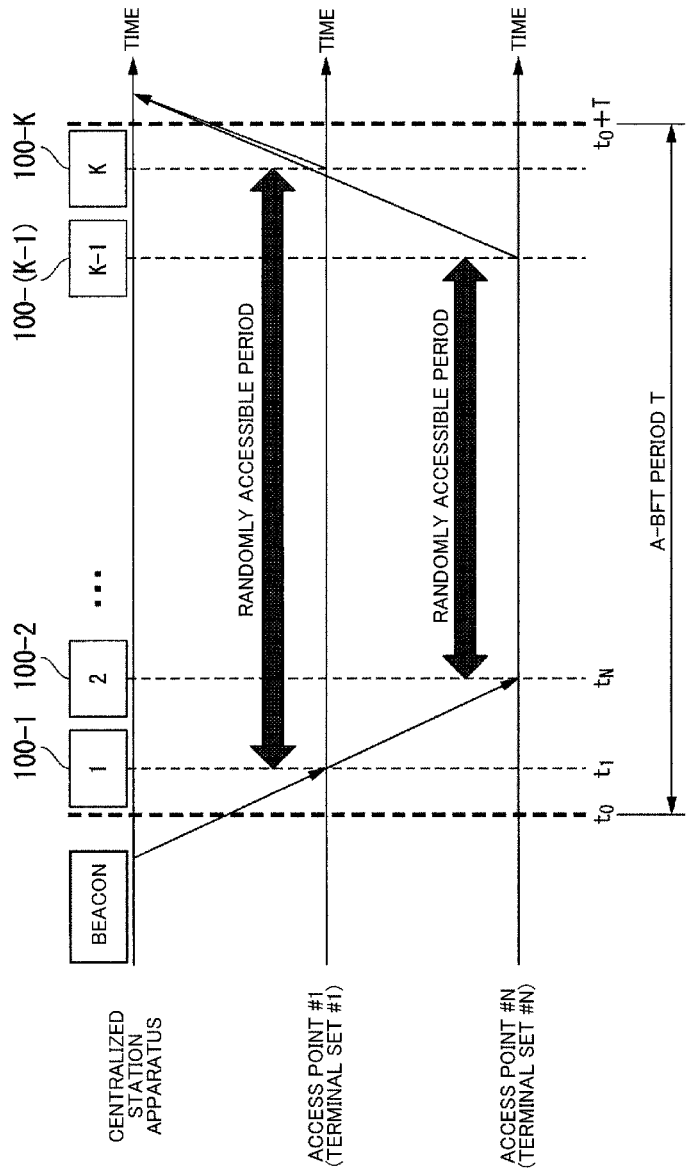
FIG. 22 illustrates an example of randomly accessible periods in an A-BFT period.

FIG. 20 is a sequence diagram indicating an example of a communication procedure between the centralized station apparatus 20 and the access point 22b according to the second embodiment. The access point 22b-(n+1) that does not belong to any group is connected via the optical fiber 21-(n+1) to the third transmission unit 225 of the access point 22b-n that belong to the group.

The centralized station apparatus 20 describes the time of transmission of the DMG beacon frame in "Timestamp" (FIG. 2) in the DMG beacon frame. The centralized station apparatus 20 describes 1 in "CC Present" (FIG. 3) of "Beacon Interval" in the DMG beacon frame. The centralized station apparatus 20 transmits multiple DMG beacon frames to the access point 22b-n that belongs to the group (the grouped access point) (step S301).

The access point 22b-n transfers the DMG beacon frames to the access point 22b-(n+1). The access point 22b-n stores the time of transfer of the DMG beacon frames (step S302).

The access point 22b-(n+1) receives the DMG beacon frames. The access point 22b-(n+1) decodes the received DMG beacon frames. The access point 22b-(n+1) stores the times of receipt of the DMG beacon frames (step S303).

The access point 22b-(n+1) describes the time of receipt of the last transmitted DMG beacon frame in "Reference Timestamp" (FIG. 5) of "Cluster Report" (FIG. 4) of the announce frame to be transmitted. The access point 22b-(n+1) describes 1 in "Cluster Request" (FIG. 6) of "Cluster Report Control" (FIG. 5) in "Cluster Report" of the announce frame to be transmitted. The access point 22b-(n+1)-n transmits the announce frame to the access point 22b-n (step S304).

The access point 22b-n acquires the announce frame from the access point 22b-(n+1). The access point 22b-n acquires time information described in "Reference Timestamp" (FIG. 5) from the announce frame. The access point 22b-n derives a difference between a time "$t_N$" described in "Reference Timestamp" and a time "to" described in "Timestamp" (FIG. 2) in the last transmitted DMG beacon frame. The access point 22b-n derives a propagation delay time (estimated value) between the access point 22b-n and the access point 22b-(n+1) based on the derived difference (step S305).

Based on the derived propagation delay time, the access point 22b-n derives the number of time slots usable for upstream communication connection made by the access point 22b-(n+1). The access point 22b-n performs grouping on the access point 22b-(n+1) based on the number of time slots usable by the access point 22b-(n+1). In other words, the access point 22b-n determines the group of the access point 22b-(n+1) according to the number of time slots selectable by the access point 22b-(n+1) (step S306).

The access point 22b-n describes the result of grouping of the access point 22b-(n+1) (an identifier indicating the group) in "Cluster Time Offset Index" (FIG. 7) of "Cluster Time Offset" in the action frame to be transmitted. The centralized station apparatus 20 transmits the action frame to the access point 22b-(n+1) (step S307).

The access point 22b-(n+1) acquires the action frame. The access point 22b-(n+1) decodes the acquired action frame. The access point 22b-(n+1) stores the group of the access point 22b (a value described in "Cluster Time Offset Index") as a result of grouping (step S308).

The access point 22b-n describes the results of grouping of the access point 22b-n and the access point 22b-(n+1) in "Available Cluster Time Offset Bitmap" (FIG. 19) of "ECAPC Policy" (FIG. 4) in the announce frame. For example, if the access point 22b-n belongs to group "1" and the access point 22b-(n+1) belongs to group "2," 1 is described in the first bit and the second bit of "Available Cluster Time Offset Bitmap" and 0 is described in other bits of "Available Cluster Time Offset Bitmap." The access point 22b-n transmits the announce frame to the centralized station apparatus 20 (step S309).

As described above, the access points 22b are cascade-connected via the optical fibers 21-1 to 21-N. Based on the propagation delay times in the optical fibers 21, the centralized station apparatus 20 performs grouping such that the access points 22b with a difference in propagation delay time within a threshold value belong to the same group. The access points 22b make communication connections in groups to the wireless terminals 30 subordinate to the access points 22b. The access point 22b derives a propagation delay time based on a time stamp described in a frame to be transmitted through the optical fiber 21.

As described above, the centralized station apparatus 20 performs grouping on the access points 22b based on propagation delay times in the optical fibers 21. Thus, even if the access points 22b are cascade-connected and propagation delay times between the centralized station apparatus and the access points vary among the access points, a chance for radio communications by the wireless terminals in the upstream direction can be equally provided at the access points by the centralized station apparatus 20.

The embodiments were specifically described with reference to the accompanying drawings. The specific configuration is not limited to the foregoing embodiments and includes designs or the like without departing from the spirit of the invention.

INDUSTRIAL APPLICABILITY

The present invention is applicable to an RoF radio communication system.

REFERENCE SIGNS LIST 1a, 1b Communication system
2a, 2b Base station apparatus
3 Terminal set
20 Centralized station apparatus
21 Optical fiber
22a, 22b Access point
30 Wireless terminal
200 Centralized-station control unit
201 Delay management unit
202 First transmission unit
210 Processor
211 Storage unit
212 Communication unit
221 Second transmission unit
222 Grouping control unit
223 Antenna control unit
224 Antenna

The invention claimed is:

1. A base station apparatus comprising a centralized station apparatus, one or more wireless terminals, and a plurality of access points connected to the centralized station apparatus via optical fibers,
wherein based on propagation delay times in the optical fibers, the centralized station apparatus performs grouping such that one or more access points, among the plurality of access points, with a difference in propagation delay time within a threshold value, belong to the same group, and
the plurality of access points perform connection processing for each of the groups, to communicate with the one or more wireless terminals subordinate to the plurality of access points, wherein the centralized station apparatus or the access points derive the difference in the propagation delay time based on a time stamp described in a frame to be transmitted through the optical fiber by the base station and a second time stamp from a frame to be transmitted through the optical fiber by the access points, and
wherein:
the centralized station apparatus is further configured to derive a number of time slots usable for a communication connection between the plurality of access points and the one or more wireless terminals based on the difference in propagation delay times, and
at least one grouping of the plurality of access points is based on the number of time slots usable by the group of the plurality of access points to perform wireless communication with the wireless terminal.

2. The base station apparatus according to claim 1, wherein the communication connection is beamforming training with random access.

3. The base station apparatus according to claim 1, wherein the threshold value is a value expressed by using a time length of a predetermined time slot.

4. The base station apparatus according to claim 1, wherein in a period during which a response is made by the access point and the wireless terminals subordinate to the access point, the access point transmits a control signal indicating a direction of a beam to the centralized station apparatus and transmits, to the wireless terminals subordinate to the access point, a control signal indicating a direction that obtains maximum received power.

5. The base station apparatus according to claim 1, wherein in a period during which no response is made by the access point or the wireless terminals subordinate to the access point, the access point transmits, to the wireless terminals subordinate to the access point, a control signal indicating a direction that obtains maximum received power.

6. A communication method performed by a base station apparatus comprising a centralized station apparatus and a plurality of access points connected to the centralized station apparatus via optical fibers,
  wherein based on propagation delay times in the optical fibers, the centralized station apparatus performs grouping such that access points, among the plurality of access points, with a difference in propagation delay time within a threshold value, belong to the same group, and
  the plurality of access points perform connection processing for each of the groups, to communicate with wireless terminals subordinate to the plurality of access points, wherein the centralized station apparatus or the access points derive the difference in the propagation delay time based on a time stamp described in a frame to be transmitted through the optical fiber by the base station and a second time stamp from a frame to be transmitted through the optical fiber by the access points
  wherein:
    the centralized station apparatus is further configured to derive a number of time slots usable for a communication connection between the plurality of access points and the one or more wireless terminals based on the difference in propagation delay times, and
    at least one grouping of the plurality of access points is based on the number of time slots usable by the group of the plurality of access points to perform wireless communication with the wireless terminal.

7. The communication method according to claim 6, wherein the communication connection is beamforming training with random access.

8. The communication method according to claim 6, wherein the threshold value is a value expressed by using a time length of a predetermined time slot.

9. The communication method according to claim 6, wherein in a period during which a response is made by the access point and the wireless terminals subordinate to the access point, the access point transmits a control signal indicating a direction of a beam to the centralized station apparatus and transmits, to the wireless terminals subordinate to the access point, a control signal indicating a direction that obtains maximum received power.

10. The communication method according to claim 6, wherein in a period during which no response is made by the access point or the wireless terminals subordinate to the access point, the access point transmits, to the wireless terminals subordinate to the access point, a control signal indicating a direction that obtains maximum received power.

11. A centralized station apparatus connected to a plurality of access points via optical fibers, comprising:
  a centralized-station control unit for performing grouping based on propagation delay times in the optical fibers such that access points, among the plurality of access points, with a difference in propagation delay time within a threshold value, belong to the same group, wherein the centralized station apparatus or the access points derive the difference in the propagation delay time based on a time stamp described in a frame to be transmitted through the optical fiber by a base station and a second time stamp from a frame to be transmitted through the optical fiber by the access points; and
  a transmission unit for notifying a result of grouping to the plurality of access points that perform connection processing for each of the groups, to communicate with wireless terminals subordinate to the plurality of access points,
  wherein:
    the centralized station apparatus is further configured to derive a number of time slots usable for a communication connection between the plurality of access points and the one or more wireless terminals based on the difference in propagation delay times, and
    at least one grouping of the plurality of access points is based on the number of time slots usable by the group of the plurality of access points to perform wireless communication with the wireless terminal.

12. The centralized station apparatus according to claim 11, wherein the communication connection is beamforming training with random access.

13. The centralized station apparatus according to claim 11, wherein the threshold value is a value expressed by using a time length of a predetermined time slot.

14. The centralized station apparatus according to claim 11, wherein in a period during which a response is made by the access point and the wireless terminals subordinate to the access point, the access point transmits a control signal indicating a direction of a beam to the centralized station apparatus and transmits, to the wireless terminals subordinate to the access point, a control signal indicating a direction that obtains maximum received power.

15. The centralized station apparatus according to claim 11, wherein in a period during which no response is made by the access point or the wireless terminals subordinate to the access point, the access point transmits, to the wireless terminals subordinate to the access point, a control signal indicating a direction that obtains maximum received power.

* * * * *